E. NOEL.
UNIVERSAL JOINT.
APPLICATION FILED AUG. 30, 1920.
1,389,970.
Patented Sept. 6, 1921.
2 SHEETS—SHEET 1.
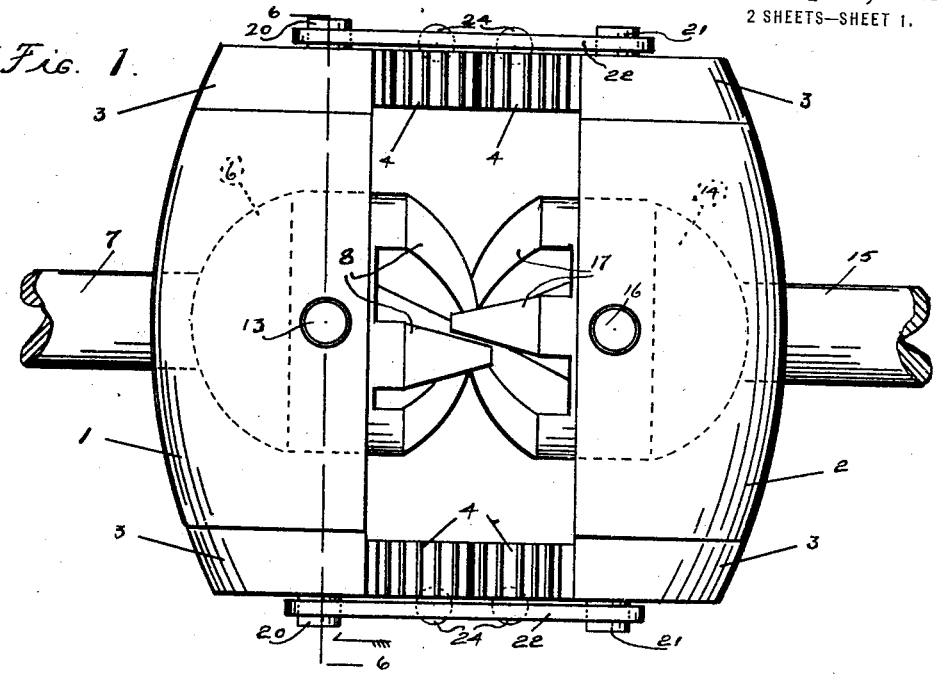
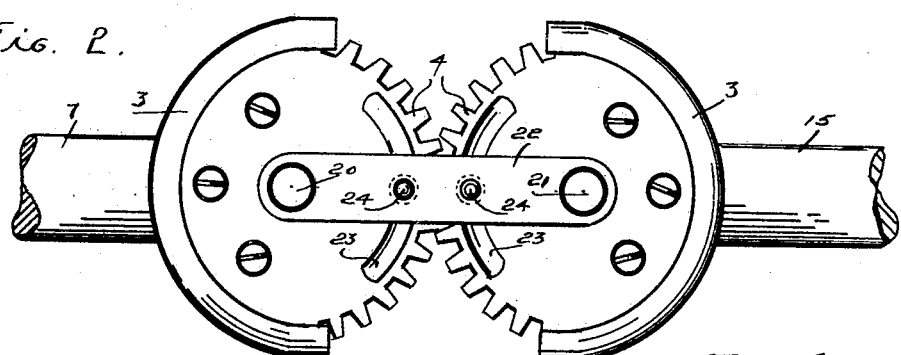
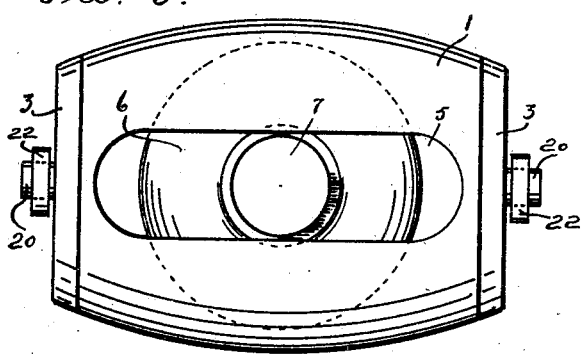
INVENTOR
Eli Noel.
By M. C. Gillham.
Attorney.

E. NOEL.
UNIVERSAL JOINT.
APPLICATION FILED AUG. 30, 1920.
1,389,970.
Patented Sept. 6, 1921.
2 SHEETS—SHEET 2.
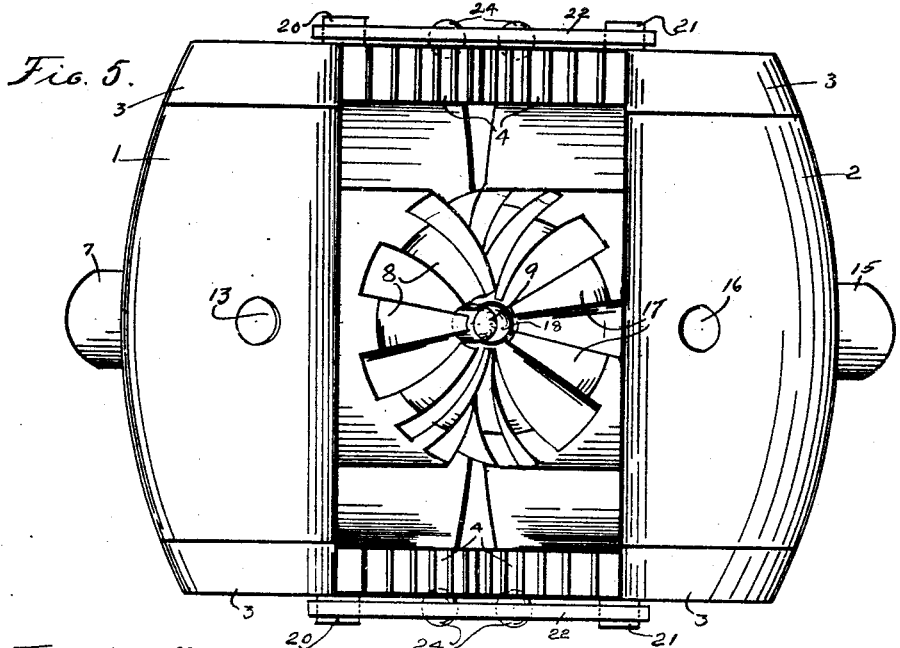
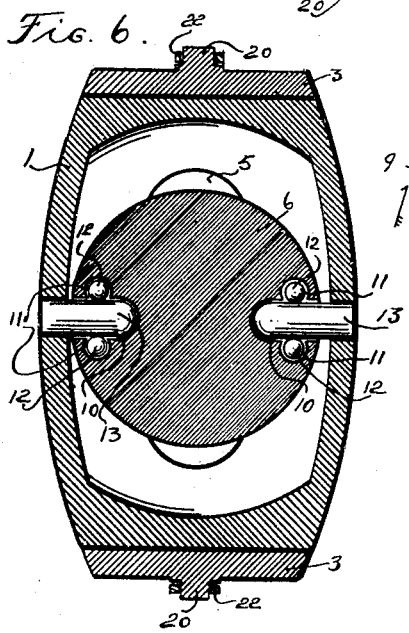
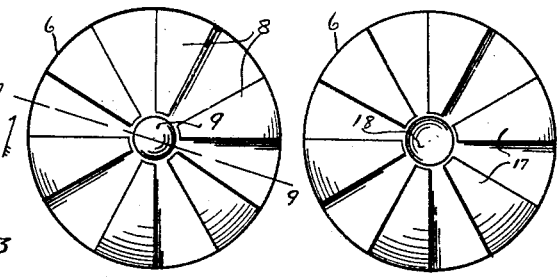
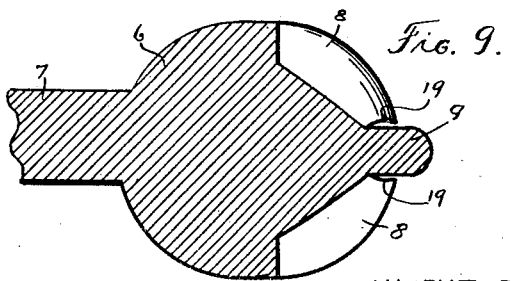
INVENTOR.
Eli Noel.
By M. C. Gillham.
Attorney.

UNITED STATES PATENT OFFICE.

ELI NOEL, OF KANSAS CITY, MISSOURI.

UNIVERSAL JOINT.

1,389,970.

Specification of Letters Patent. Patented Sept. 6, 1921.

Application filed August 30, 1920. Serial No. 407,045.

*To all whom it may concern:*

Be it known that I, ELI NOEL, a citizen of the United States, residing at Kansas City, in the county of Jackson and State of Missouri, have invented a new and useful Universal Joint, of which the following is a specification.

My invention relates to universal joints and particularly to a device of this character having power receiving and power transmitting devices, and the object of the invention is to provide a simple, durable, and efficient universal joint having great flexibility.

I attain this object by means of the mechanism illustrated in the accompanying drawing in which—Figure 1, is a side elevation of a universal joint constructed in accordance with my invention. Fig. 2, is a top view of the same. Fig. 3, is an end view of the same. Fig. 4, is a plan view of the lower side of the coupling bars. Fig. 5, is a side elevation of the joint, and showing the same flexed. Fig. 6, is a longitudinal section of one of the housing members, on the line 6—6, in Fig. 1. Fig. 7, is a plan view of one of the gears, and showing the projecting center thereon. Fig. 8, is a plan view of the other of the gears, and showing the depression therein for receiving the center of the other gear and, Fig. 9, is a cross section of the gear having the center, on the line 9—9, in Fig. 7.

Similar numerals of reference refer to corresponding parts throughout the several views.

The universal joint consists of two similar metal trough shaped members 1 and 2, on the ends of which members heads 3, provided with semi-circular racks 4, are secured in such a manner that the racks shall project inwardly of the members and mesh with each other when the device is operatively assembled.

In the backs of the members slots 5, are apertured longitudinally thereof. A spherical mass of metal 6, having an integral stub shaft 7, at the axis thereof, is provided forwardly with radially extending convexed cogs 8, having concaved sides and thereby forming a gear. At the axis of the mass and gear and alined with the shaft 7, is a projecting center 9, having a convexed end, and which is projected a little distance in advance of the inner ends of the cogs. The mass proper is provided with oppositely disposed bores 10, and in the walls thereof with a plurality of pockets 11, containing balls 12, thereby forming ball bearings for alined pivot pins 13, which are secured in the sides of the member 1. A similar mass of metal 14, having a similar stub shaft 15, and bores with ball bearings for pivot pins 16, is pivotally mounted in the member 2, and is similarly provided with radially extending convexed cogs 17, having concaved sides adapted for meshing with the first mentioned cogs. At the axial center of the last mentioned gear a concaved depression 18, is formed and adapted for receiving the convexed end of the pin 9. The inner ends of the cogs 8 and 17, are concaved, as shown at 19, in Fig. 9, so that the convexed end of the pin 9, shall have opportunity to roll in and out of the depression 18, whenever the joint is flexed. Pivots 20 and 21, are formed integral with the outer plane sides of the heads 3, and are alined with the pivot pins 13 and 16, respectively, but are extended at right angles thereto. Connecting bars or couplings 22, are pivotally mounted on the pivots 20 and 21, and thereby the integrity of the meshing of the gears and racks are preserved at all times. To reduce the friction between the couplings 22, and the heads 3, races 23, are formed in the outer sides of the heads in which are placed balls 24, the latter being provided a bearing 25, in the couplings 22. In Fig. 1, the joint is shown in straight alinement and, in Fig. 5, the same is shown flexed. When the joint is flexed and the gears are revolved, the racks are rocked forwardly and backwardly in each revolution of the joint. The arrangement of the pivots and the couplings 22, holding the members 1 and 2, not only safeguards the centers of motion but actually provides great flexibility and allows the joint to be flexed at any angle less than a right angle and to receive and transmit power throughout 360 degrees of arc.

Having described my invention what I claim is—

A universal joint, comprising paired trough shaped members having elongated longitudinal slotted apertures in the backs thereof, semi circular racks combined with the ends of said members and the respective end racks enmeshed, coupling bars pivotally mounted on said racks to hold the racks enmeshed and permit rocking of said members, and power receiving and power transmitting devices pivotally mounted in the sides of said members and having shafts traveling in the slotted apertures therein, said devices having enmeshed radially extending convexed cogs having concaved sides and concaved ends, the one of said devices being provided at the axial center thereof with a projecting center pin or stud having a convexed head and the other of the devices being provided at the axial center thereof with a concaved depression adapted for receiving the convexed end of the stud on said first mentioned device.

Dated Kansas City, Missouri, August 24, 1920.

ELI NOEL.

Witnesses:
 ELIAS BERELL,
 BATTLE MCCARDLE.